US011254288B1

(12) United States Patent
Elangovan et al.

(10) Patent No.: US 11,254,288 B1
(45) Date of Patent: Feb. 22, 2022

(54) DYNAMIC RELAY ATTACK PREVENTION USING TIME OF FLIGHT AND RF FINGERPRINTING

(71) Applicant: FORD GLOBAL TECHNOLOGIES, LLC, Dearborn, MI (US)

(72) Inventors: Vivekanandh Elangovan, Canton, MI (US); Rita Barrios, Novi, MI (US); Zachary Albright, West Bloomfield, MI (US); John Robert Van Wiemeersch, Novi, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 17/084,248

(22) Filed: Oct. 29, 2020

(51) Int. Cl.
*B60R 25/24* (2013.01)
*G01S 13/08* (2006.01)
*B60R 25/01* (2013.01)
*G07C 9/00* (2020.01)

(52) U.S. Cl.
CPC ............ *B60R 25/241* (2013.01); *B60R 25/01* (2013.01); *B60R 25/245* (2013.01); *G01S 13/08* (2013.01); *G07C 9/00309* (2013.01); *B60R 2325/105* (2013.01); *G07C 2009/00555* (2013.01); *G07C 2209/63* (2013.01)

(58) Field of Classification Search
CPC . B60R 25/241; B60R 25/01; B60R 2325/105; B60R 25/245; G01S 13/08; G01S 5/02521; G01S 5/02522; G01S 5/02523; G01S 5/02524; G01S 5/02525; G01S 5/02526; G01S 5/02527; G01S 5/02528; G01S 5/02529; G07C 9/00309; G07C 2009/00555; G07C 2209/63; G07C 2209/14; G06Q 20/3825
USPC ................................................ 340/5.72, 5.61
See application file for complete search history.

(56) References Cited

U.S. PATENT DOCUMENTS

| 10,594,727 | B2 | 3/2020 | Rogel et al. |
| 11,037,387 | B1* | 6/2021 | Elangovan ......... G07C 9/00309 |
| 2014/0169193 | A1 | 6/2014 | Eder |
| 2018/0374290 | A1 | 12/2018 | Bjorkengren |
| 2019/0241154 | A1 | 8/2019 | Elangovan et al. |
| 2020/0120509 | A1* | 4/2020 | Stitt ......................... G01S 13/84 |
| 2020/0254968 | A1* | 8/2020 | Hassani ................... B60R 25/24 |
| 2021/0001807 | A1* | 1/2021 | Park ....................... H04W 12/04 |
| 2021/0126912 | A1* | 4/2021 | Maclean ............. H04W 12/065 |

OTHER PUBLICATIONS

Oliveira et al., Fusing Time-of-Flight and Received Signal Strength for Adaptive Radio-Frequency Ranging, International Conference on Advanced Robotics (ICAR), Nov. 2013.

(Continued)

*Primary Examiner* — Edwin C Holloway, III
(74) *Attorney, Agent, or Firm* — Frank L. Lollo; Brooks Kushman P.C.

(57) ABSTRACT

Controlled access to a vehicle is provided. Whether time of flight (ToF) between an access device and a controller of the vehicle indicates a relay attack is identified. Whether a radio frequency (RF) fingerprint of the access device indicates a relay attack is identified. Responsive to the RF fingerprint but not the ToF indicating a relay attack, the ToF determination is retried. Passive access is allowed to the vehicle responsive to the retried ToF again indicating no relay attack.

20 Claims, 3 Drawing Sheets

(56) References Cited

OTHER PUBLICATIONS

Yu et al., A Guide of Fingerprint Based Radio Emitter Localization Using Multiple Sensors, IEICE Transactions on Communications, Institute of Electronics, Information and Communication Engineers (IEICE), vol. E101-B, No. 10, Oct. 2018.
Joo et al., Hold the Door! Fingerprinting Your Car Key to Prevent Keyless Entry Car Theft, Network and Distributed Systems Security (NDSS) Symposium 2020, San Diego, CA, Feb. 23-26, 2020.
Hoelscher, Penny, What is a Relay Attack (with examples) and How Do You Prevent Them?, retrieved from https://www.comparitech.com/blog/information-security/what-is-relay-attack/ on Oct. 14, 2020.

\* cited by examiner

DYNAMIC RELAY ATTACK PREVENTION USING TIME OF FLIGHT AND RF FINGERPRINTING

TECHNICAL FIELD

Aspects of the disclosure generally relate to dynamic relay attack prevention using a combination of time of flight and radio frequency (RF) fingerprinting techniques.

BACKGROUND

Vehicle key fobs may be used to allow a user to gain access to a vehicle. Some fob devices operate such that when a button is pressed on the fob, the device sends a code to the vehicle to instruct the vehicle to unlock the vehicle. Passive entry and passive start (PEPS) key fobs operate without a customer interaction with the fob buttons to provide a response to a challenge pulse train sent by the vehicle, where if a proper response is received by the vehicle then the door may be unlocked by a user grasping the door handle.

Relay attacks on PEPS key systems are a growing concern among automotive OEMs. These attacks are becoming more common since the cost of the equipment required to perform them has fallen dramatically. In a typical two-device relay attack, an attacker captures the vehicle's low frequency (LF) signals with a device, which then relays these signals to another device that is nearer to the key. The second device then transmits these LF signals to the key. In a one-device relay attack, an attacker amplifies and relays the vehicle's LF signals to a key that beyond the typical radio range from the vehicle but in range of the amplified or relayed LF signal. In either case, the key fob sends indicators of the strengths of the LF signals back to the vehicle. Based on these signal strengths, the vehicle determines that the key is near or inside of the vehicle. In this way, the attacker is able to gain access to the vehicle and drive it away without even touching the vehicle's key.

SUMMARY

In one or more illustrative examples, a vehicle includes a controller programmed to identify whether Time of Flight (ToF) between an access device and the controller indicates a relay attack; identify whether a radio frequency (RF) fingerprint of the access device indicates the relay attack; responsive to the RF fingerprint but not the ToF indicating the relay attack, retry the ToF determination; and allow passive access to the vehicle responsive to the retried ToF again indicating no relay attack.

In one or more illustrative examples, a vehicle includes a controller programmed to receive a request to unlock the vehicle from a first device of a plurality of access devices; identify, for each of a plurality of access devices, whether time of flight (ToF) between each access device and the controller indicates a relay attack; identify, for each of a plurality of access devices, whether a Radio Frequency (RF) fingerprint of each access device indicates the relay attack; and allow passive access to the vehicle responsive to the RF fingerprint for the first device and the RF fingerprint of a second device of the plurality of access devices both indicating no relay attack, and the ToF for the second device indicating no relay attack.

In one or more illustrative examples, a method for controlled access to a vehicle is provided. It is identified whether Time of Flight (ToF) between an access device and a controller of the vehicle indicates a relay attack. It is also identified whether a Radio Frequency (RF) fingerprint of the access device indicates the relay attack. Responsive to the RF fingerprint but not the ToF indicating the relay attack, the ToF determination is retried. Passive access is allowed to the vehicle responsive to the retried ToF again indicating no relay attack.

In one or more illustrate examples, a method for controlled access to a vehicle is provided. A request to unlock the vehicle is received from a first device of a plurality of access devices. For each of the plurality of access devices, it is identified whether or not Time of Flight (ToF) between each access device and the vehicle indicates a relay attack. For each of the plurality of access devices, it is also identified whether or not a Radio Frequency (RF) fingerprint of each access device indicates the relay attack. Passive access to the vehicle is allowed responsive to the RF fingerprint for the first device and the RF fingerprint for a second device of the plurality of access devices both indicating no relay attack, and the ToF for the second device indicating no relay attack.

DETAILED DESCRIPTION

Figure 1:
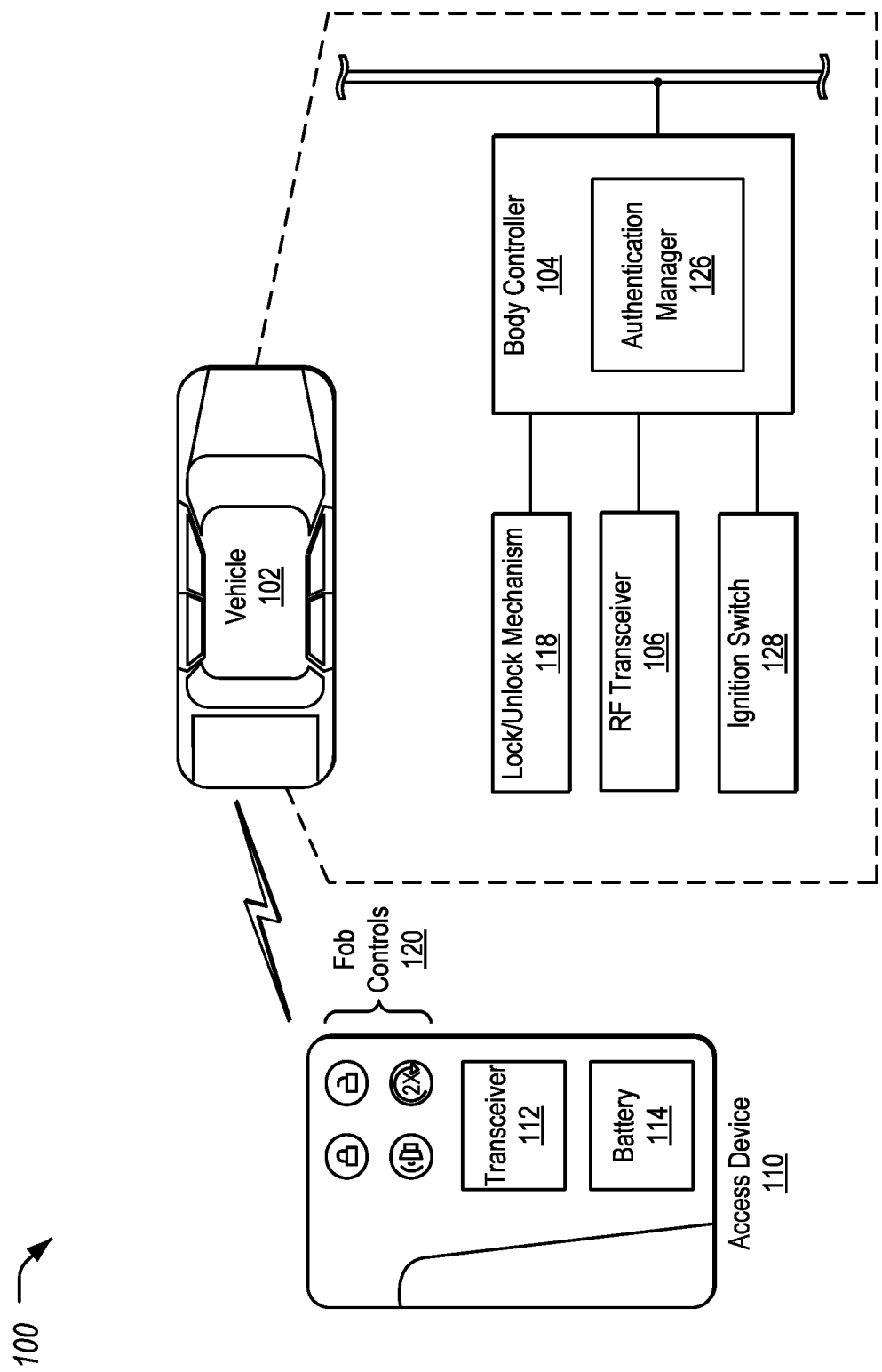
FIG. 1 illustrates an example passive entry system for a vehicle.

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Many PEPS key systems are susceptible to relay attacks because they rely solely on signal strength to determine the key's distance and general location. One method of detecting and preventing relay attacks involves measuring the signal time of flight over Wi-Fi (or ultra-wide band (UWB), Bluetooth™ low energy (BLE), etc.) between the vehicle and the key in addition to measuring the strengths of the LF signals. From this measured time, distance can be derived by multiplying by the speed of light. Were the signal to have been relayed, additional time would show in the time of flight measurement and thus add distance to the derived distance. Therefore, a reliable distance threshold based on signal time of flight can be established so that successful relay attacks can be prevented.

Another approach to relay attack detection is to implement RF Fingerprinting. In this technique, RF signals are fingerprinted for their unique non-linear characteristics. Then, when signals are received these non-linear characteristics are validated to ensure that the signals being received are from the correct device. If other signals are injected in-between, such as via a capture and replay or using an amplifier to increase the distance traveled as is done in a relay attack, the signals' non-linear characteristics are changed. For instance, the amplifying device may exhibit a different non-linear property which is detected by the receiving vehicle.

As discussed in detail herein, Time of Flight (ToF) along with RF fingerprinting may be utilized in a key fob, which improves the security in the key fobs. However, such techniques cannot simply be used together, as it may be unclear what to do in situations where one approach suggests a relay attack while the other does not. For example, the ToF may indicate a genuine request while RF fingerprinting may indicate a possible relay attack. When multiple relay attack mitigation factors are implemented and each has their own False Acceptance Rate (FAR), an approach may be used to identify which data to trust and which approach receives a higher confidence or reliability on which to make the decision to allow the customer access to the vehicle. Moreover, this approach can be performed unknown and transparent to the customer by which method a relay attack is mitigated. This behind-the-scenes determination also makes it more difficult for an attacker to avoid detection. Such techniques for using these measures to determine reliability are discussed in detail herein.

FIG. 1 illustrates an example passive entry system 100 for a vehicle 102. The vehicles 102 may include various other types of passenger vehicles, such as sedans, crossover utility vehicles (CUVs), vans, sport utility vehicles (SUVs), trucks, recreational vehicles (RVs), scooters, drones, or other mobile machines for transporting people or goods. In many cases, the vehicle 102 may be powered by an internal combustion engine. In such cases, the fuel source may be gasoline or diesel fuel. As another possibility, the vehicle 102 may be a hybrid electric vehicle (HEV) powered by both an internal combustion engine and one or more electric motors, such as a series hybrid electric vehicle (SHEV), a parallel hybrid electric vehicle (PHEV), or a parallel/series hybrid electric vehicle (PSHEV). As yet a further possibility, the vehicle 102 may be an electric vehicle (EV) powered by electric motors without an internal combustion engine. As the type and configuration of vehicles 102 may vary, the capabilities of the vehicles 102 may correspondingly vary. As some other possibilities, vehicles 102 may have different capabilities with respect to passenger capacity, towing ability and capacity, and storage volume.

The vehicle 102 includes a body controller 104 in communication with a Radio Frequency (RF) transceiver 106. An access device 110 may be in communication with the RF transceiver 106 utilizing a transceiver 112 powered by a battery 114. A lock/unlock mechanism 118 may be operably coupled to the controller 104. The controller 104 may be configured to control the lock/unlock mechanism 118 to unlock/lock doors of the vehicle 102 in response to the RF signals transmitted by the access device 110. The access device 110 may include one or more active access controls 120, such as a lock switch and an unlock switch. Accordingly, the controller 104 may control the lock/unlock mechanism 118 to lock the doors of the vehicle 102 in response to a user depressing a lock control 120 of the access device 110, and to unlock the doors of the vehicle 102 in response to the user depressing an unlock control 120 of the access device 110.

The access device 110 may be implemented in connection with a PEPS system. With the PEPS system, the controller 104 may control the lock/unlock mechanism 118 to unlock the door in response to the controller 104 determining that the access device 110 is a predetermined distance away from the vehicle 102. In such a case, the access device 110 automatically (or passively) transmits encrypted RF signals (e.g., without user intervention) in order for the controller 104 to decrypt (or decode) the RF signals and to determine whether the access device 110 is within the predetermined distance and is authorized. It is to be noted that with the PEPS implementation, the access device 110 also generates RF signals which correspond to encoded lock/unlock signals in response to a user depressing a lock control 120 or an unlock control 120. In addition, with the PEPS system, a physical key may not be needed to start the vehicle 102. The user in this case may be required to depress the brake pedal switch or perform some predetermined operation prior to depressing an ignition switch 128 after the user has entered into the vehicle 102.

It should be noted that in many examples herein, the access device 110 is discussed as being a fob with PEPS functionality. However, in other cases, the access device 110 may be implemented as a component of a phone or other mobile device, and/or using other communications protocols over which ToF and RF fingerprinting techniques are applicable.

The controller 104 may include an authentication manager 126 configured to implement strategies to determine whether communications between the access device 110 and RF transceiver 106 are authentic. The authentication manager 126 may also be configured to authenticate the particular type of mechanism used to start the vehicle 102. For example, with a PEPS implementation, the authentication manager 126 may authenticate the RF encrypted data passively transmitted by the transceiver 112 to allow the user to start the engine of the vehicle 102. In addition to the authentication manager 126 authenticating the RF encrypted data, the user may perform a predetermined operation (e.g., pull handle of a door, or open door, toggle the brake pedal switch, or other operation) prior to depressing a start switch to start the vehicle 102.

Figure 2:
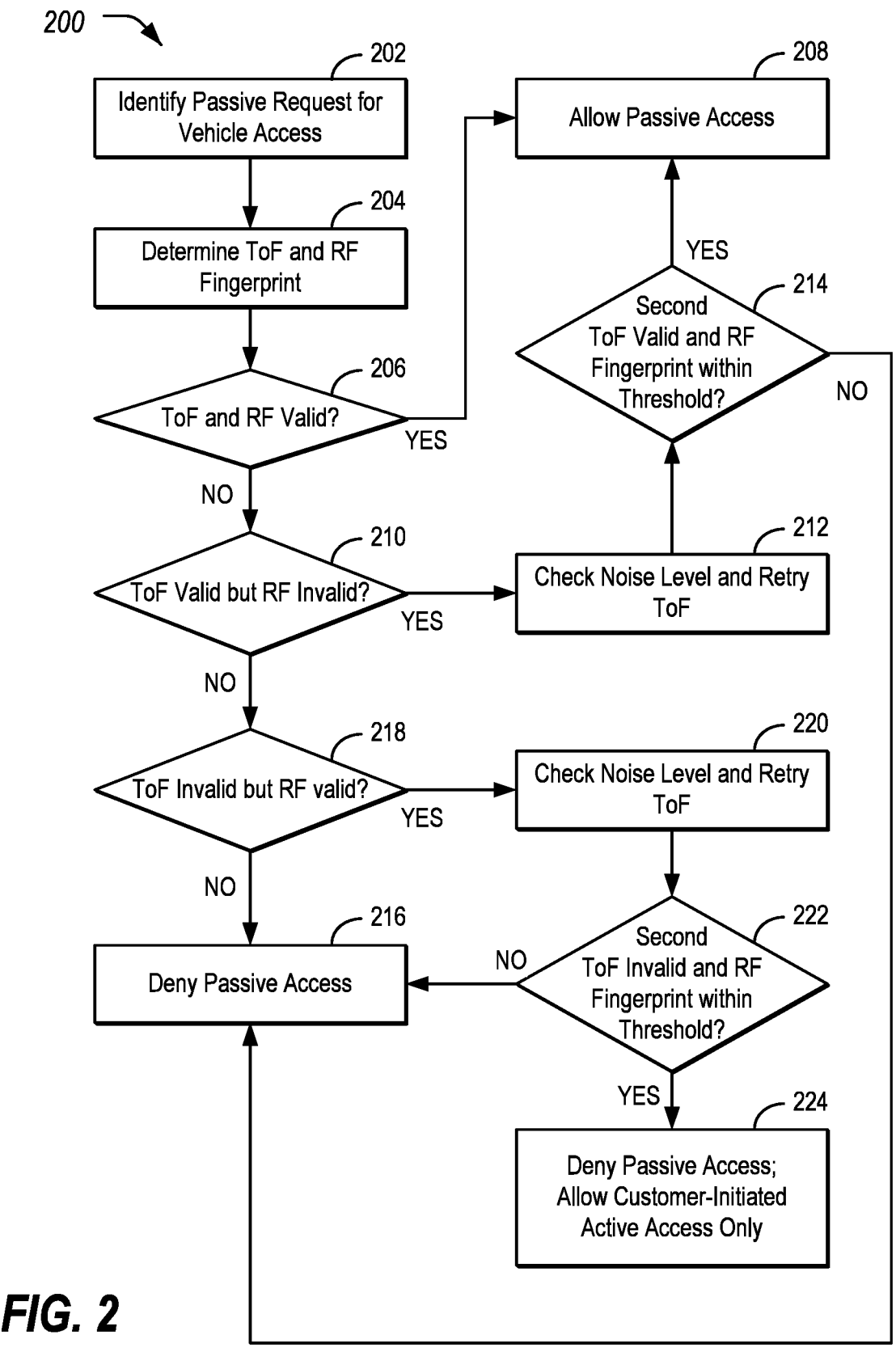
FIG. 2 illustrates an example process for dynamic relay attack prevention using a combination of time of flight and RF fingerprinting techniques.

FIG. 2 illustrates an example process 200 for dynamic relay attack prevention using a combination of time of flight and RF fingerprinting techniques. In an example, the process 200 may be performed by the authentication manager 126 of the controller 104 of the vehicle 102.

At operation 202, the controller 104 identifies a passive request to unlock the vehicle 102, in an example, such as a user approaching the vehicle 102 and/or placing a hand by a door handle or other unlock location.

At operation 204, ToF and RF fingerprinting techniques are performed by the controller 104 on the communications between the RF transceiver 106 in communication with the controller 104 of the vehicle 102 and the transceiver 112 of the access device 110. As noted above, ToF is a measurement of round-trip time (RTT) for a wireless transmission. Because ToF measures time, it can be used to estimate distance of the access device 110 from the vehicle 102. Additionally, phase measurement may also be used as a gross estimate whether the access device 110 fob is near or far. RF fingerprinting may also be performed to determine a signature based on various properties of the transmissions from the access device 110 received to the controller 104.

Using the information, the controller 104 determines whether the ToF measurement indicates a relay attack. This may be accomplished, in an example, by ensuring that the ToF measurement is below a maximum threshold time. Also, the controller 104 determines whether the RF fingerprint indicates a relay attack. This may be accomplished, in an example, by determining a similarity score of the RF fingerprint compared to stored fingerprints for authorized access devices 110.

At operation 206, the controller 104 determines whether the ToF and the RF determinations are both valid (i.e., that neither indicates a relay attack). If so, control passes to operation 208 to allow the passive access to the vehicle 102. After operation 208, the process 200 ends. However, in some situations the results may disagree. In such instances, further analysis may be useful to determine the correct authentication result.

If, for instance, the ToF and the RF determinations are not both valid, control passes to operation 210. At operation 210, the controller 104 determines whether the ToF determination is valid, but the RF determination is inconclusive as to whether there is a relay attack. If so, control passes to operation 212.

At operation 212, the controller 104 considers noise level and ToF retries. For instance, the controller 104 may analyze environmental factors to determine whether accuracy of the RF fingerprint may be lowered. For instance, if the receiver temperature is high or if the RSSI received by the receiver is very low, then at operation 214 the controller 104 can infer that the fingerprinting was less likely to be accurate, and the ToF may be better to rely upon. In such an instance, the controller 104 may invoke a second ToF determination as a confirmation that ToF measured during the first verification is valid. If the ToF still indicates a valid request, control passes to operation 208 to allow passive access. If, however, at operation 214 the second ToF determination indicates a timing indicative of a relay attack, and/or if the environmental or signal strength factors indicate that the RF fingerprint was less accurate than typical, control passes to operation 216 to deny passive access.

Returning to the other branch at operation 210, if conditions aren't met control passes to operation 218 for the controller 104 to determine whether the ToF determination is invalid, but the RF determination is valid. If so, control passes to operation 220. At operation 220, similar to operation 212, the controller 104 considers noise level and ToF retries. If at operation 222, a second ToF determination still indicates an invalid request but the RF fingerprint is within a tight threshold, control passes to operation 224 to deny passive access but to allow customer-initiated active access such as using a door handle to trigger door unlock. If the RF fingerprint is not closely matched, control passes to operation 216 to deny passive access. Also, while not shown, if the second ToF is valid then control may pass to operation 208 to allow passive access. Finally, control ends at operation 216 if both ToF and RF fingerprint suggest relay attack, in which case the request to the vehicle 102 is denied.

Figure 3:
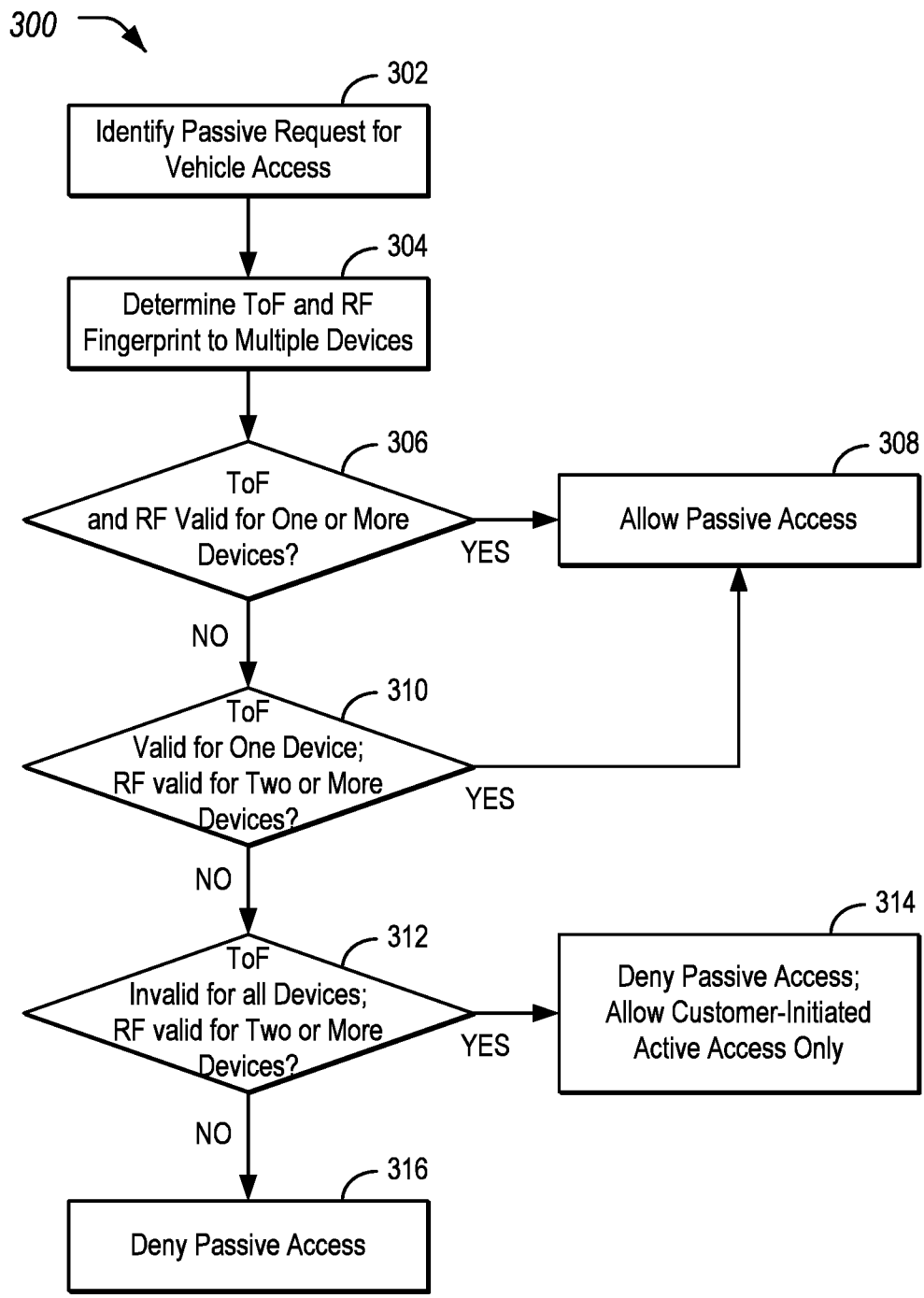
FIG. 3 illustrates an example process for dynamic relay attack prevention using a combination of time of flight and RF fingerprinting techniques using multiple access devices.

FIG. 3 illustrates an example process 300 for dynamic relay attack prevention using a combination of time of flight and RF fingerprinting techniques using two (or more) access devices 110. As with the process 200, the process 300 may be performed by the authentication manager 126 of the controller 104 of the vehicle 102.

At operation 302, as with operation 202 of the process 200, the controller 104 identifies a passive vehicle 102 request. At operation 304, similar to operation 202 of the process 200, ToF and RF fingerprinting techniques are performed by the controller 104 on the communications between the vehicle 102 and the access devices 110. However, in operation 304, multiple access devices 110 respond to the controller 104.

At operation 306, the controller 104 determines whether both the ToF and the RF fingerprint determinations indicate no relay attack for one or more access devices 110. If so, control passes to operation 308 to allow passive access.

If not, control passes to operation 310 to determine whether the ToF is valid for at least one access device 110 and the RF determinations are valid for multiple access devices 110. In such a situation, there is at least one access device 110 nearby that is confirmed to be valid. Thus, if so, control passes to operation 308 to allow passive access.

If not, control passes to operation 312 to determine whether ToF is invalid for the access devices 110 but the RF fingerprint is valid for the access devices 110. If so, control passes to operation 314, where similar to operation 224, the controller 104 denies passive access but allows customer-initiated active access. If, however, none of these conditions are met, control passes to operation 316 to deny passive access.

Variations on the described approach are possible. For instance, while many examples herein relate to relay attacks, the described techniques may additionally be applicable to replay attacks in which transmissions are stored, and later replayed to attempt access.

Computing devices described herein, such as the body controller 104 and access devices 110, generally include computer-executable instructions where the instructions may be executable by one or more computing devices such as those listed above. Computer-executable instructions may be compiled or interpreted from computer programs created using a variety of programming languages and/or technologies, including, without limitation, and either alone or in combination, JAVA™, C, C++, C#, VISUAL BASIC, JAVASCRIPT, PYTHON, JAVASCRIPT, PERL, PL/SQL, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their broadest reasonable constructions and their ordinary meanings as understood by those knowledgeable in the technologies described herein unless an explicit indication to the contrary in made herein. In particular, use of the singular articles such as "a," "the," "said," etc. should be read to recite one or more of the indicated elements unless a claim recites an explicit limitation to the contrary.

The abstract of the disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A vehicle comprising:
   a controller programmed to:
   identify whether time of flight (ToF) between an access device and the controller indicates a relay attack;
   identify whether a radio frequency (RF) fingerprint of the access device indicates the relay attack;
   responsive to the RF fingerprint but not the ToF indicating the relay attack, retry the ToF determination; and
   allow passive access to the vehicle responsive to the retried ToF again indicating no relay attack.

2. The vehicle of claim 1, wherein the controller is further programmed to:
   responsive to the ToF but not the RF fingerprint indicating a relay attack, retry the ToF and verify that the RF fingerprint has at least a minimum threshold of similarity to a reference RF fingerprint for the access device;
   allow custom-initiated active access to the vehicle but not passive access to the vehicle responsive to the retried ToF again indicating relay attack but the RF fingerprint meeting the minimum threshold of similarity; and
   deny passive access to the vehicle responsive to the RF fingerprint failing to meet the minimum threshold of similarity.

3. The vehicle of claim 1, wherein the controller is further programmed to:
   deny passive access to the vehicle responsive to the RF fingerprint and the ToF indicating the relay attack; and
   allow passive access to the vehicle responsive to neither of the RF fingerprint or the ToF indicating the relay attack.

4. The vehicle of claim 1, wherein the controller is further programmed to:
   receive a request to unlock the vehicle; and
   responsive to receipt of the request, determine the ToF and the RF fingerprint.

5. The vehicle of claim 1, wherein the ToF indicates the relay attack responsive to the ToF exceeding a predefined timeout.

6. The vehicle of claim 1, wherein the controller is further programmed to verify that the RF fingerprint has at least a minimum threshold of similarity to a reference RF fingerprint for the access device as a further condition to allowing the passive access.

7. A vehicle comprising:
   a controller programmed to:
   receive a request to unlock the vehicle from a first device of a plurality of access devices;
   identify, for each of the plurality of access devices, whether time of flight (ToF) between each access device and the controller indicates a relay attack;
   identify, for each of the plurality of access devices, whether a radio frequency (RF) fingerprint of each access device indicates a relay attack; and
   allow passive access to the vehicle responsive to the RF fingerprint for the first device and the RF fingerprint for a second device of the plurality of access devices both indicating no relay attack, and the ToF for the second device indicating no relay attack.

8. The vehicle of claim 7, wherein the controller is further programmed to allow custom-initiated active access to the vehicle but not passive access to the vehicle responsive to the RF fingerprints for the plurality of access devices indicating no relay attack but the ToFs for the plurality of access devices indicating relay attack.

9. The vehicle of claim 7, wherein the controller is further programmed to deny passive access to the vehicle responsive to none of the plurality of access devices having both a valid RF fingerprint and a ToF indicating a no relay attack.

10. The vehicle of claim 7, wherein the controller is further programmed to allow passive access to the vehicle responsive to the RF fingerprint and ToF for the first device indicating no relay attack.

11. The vehicle of claim 7, wherein the ToF indicates a relay attack responsive to the ToF exceeding a predefined timeout.

12. The vehicle of claim 7, wherein the controller is further programmed to verify that the RF fingerprint has at least a minimum threshold of similarity to a reference RF fingerprint for each of the plurality of access devices as a further condition to allowing the passive access.

13. A method for controlled access to a vehicle, comprising:
   identifying whether time of flight (ToF) between an access device and a controller of the vehicle indicates a relay attack;
   identifying whether a radio frequency (RF) fingerprint of the access device indicates the relay attack;
   responsive to the RF fingerprint but not the ToF indicating the relay attack, retrying the ToF determination; and
   allowing passive access to the vehicle responsive to the retried ToF again indicating no relay attack.

14. The method of claim 13, further comprising:
   responsive to the ToF but not the RF fingerprint indicating the relay attack, retrying the ToF and verify that the RF fingerprint has at least a minimum threshold of similarly to a reference RF fingerprint for the access device;
   allowing custom-initiated active access to the vehicle but not passive access to the vehicle responsive to the retried ToF again indicating relay attack but the RF fingerprint meeting the minimum threshold of similarity; and denying passive access to the vehicle responsive to the RF fingerprint failing to meet the minimum threshold of similarity.

15. The method of claim 13, further comprising:
denying passive access to the vehicle responsive to the RF fingerprint and the ToF indicating a relay attack; and
allowing passive access to the vehicle responsive to neither of the RF fingerprint or the ToF indicating a relay attack.

16. The method of claim 13, further comprising:
receiving a request to unlock the vehicle; and
responsive to receipt of the request, determining the ToF and the RF fingerprint.

17. The method of claim 13, wherein the ToF indicates the relay attack responsive to the ToF exceeding a predefined timeout.

18. The method of claim 13, further comprising verifying that the RF fingerprint has at least a minimum threshold of similarity to a reference RF fingerprint for the access device as a further condition to allowing the passive access.

19. A method for controlled access to a vehicle comprising:
receiving a request to unlock the vehicle from a first device of a plurality of access devices;
identifying, for each of the plurality of access devices, whether time of flight (ToF) between each access device and the vehicle indicates a relay attack;
identifying, for each of the plurality of access devices, whether a radio frequency (RF) fingerprint of each access device indicates a relay attack; and
allowing passive access to the vehicle responsive to the RF fingerprint for the first device and the RF fingerprint for a second device of the plurality of access devices both indicating no relay attack, and the ToF for the second device indicating no relay attack.

20. The method of claim 19, further comprising:
allowing custom-initiated active access to the vehicle but not passive access to the vehicle responsive to the RF fingerprints for the plurality of access devices indicating no relay attack but the ToFs for the plurality of access devices indicating relay attack; and
denying passive access to the vehicle responsive to none of the plurality of access devices having both a valid RF fingerprint and a ToF indicating a no relay attack.

* * * * *